July 20, 1937.  C. D. LAKE ET AL  2,087,324
PRINTING DEVICE
Filed Feb. 4, 1932   5 Sheets-Sheet 1

FIG.1.

July 20, 1937.  C. D. LAKE ET AL  2,087,324
PRINTING DEVICE
Filed Feb. 4, 1932  5 Sheets-Sheet 2

INVENTOR
Clair D. Lake
George F. Daly
BY
W. M. Wilson
ATTORNEY

July 20, 1937.  C. D. LAKE ET AL  2,087,324

PRINTING DEVICE

Filed Feb. 4, 1932  5 Sheets-Sheet 4

| ITEMS | NUMBERS ADDED | POSITIONS OF ACCUMULATOR WHEELS AFTER ITEM ENTRY | TOTAL PRINT |
|---|---|---|---|
| −397 | 999999603 | 999999603 | |
| +174 | 000000174 | 999999777 | |
| +721 | 000000721 | 000000498 | |
| | | Test → | → 498 * —140 |
| +172 | 000000172 | 000000172 | |
| −684 | 999999316 | 999999488 | |
| +332 | 000000332 | 999999820 | |
| | | Test → | → 180 * |

INVENTOR
Clair D. Lake
George F. Daly
BY
W. M. Wilson
ATTORNEY

Patented July 20, 1937

2,087,324

UNITED STATES PATENT OFFICE 2,087,324

PRINTING DEVICE

Clair D. Lake, Binghamton, and George F. Daly, Johnson City, N. Y., assignors, by mesne assignments, to International Business Machines Corporation, New York, N. Y., a corporation of New York Application February 4, 1932, Serial No. 590,848

8 Claims. (Cl. 235—61.8)

The invention concerns accounting machines and has for its principal object the provision of an improved and simplified total printing device. The disclosed total taking devices are shown associated with a single set of accumulating wheels which receive credit and debit items and store the balance as a true number when the credit items predominate and as a complement when the sum of the debit items is greater than the sum of the credit items.

An object of the invention is to provide devices for inverting the complemental reading of an accumulator during total taking. When the wheels of the accumulator contain a negative balance in the form of a complement, the disclosed devices are adapted to print the true number complementary to the complement, thus indicating the negative balance in a form easy to read.

Another object is to provide an electrically controlled total taking mechanism for accounting machines in which the electrical controlling circuits are simplified over those previously in use.

A feature of the invention is the automatic correction of the lower order accumulator readings to tens complements when a total is taken from an accumulator with a negative balance standing on the accumulator wheels as a complement.

An object of the invention is to provide means for taking three different types of readings of an entry receiving and storing device, and printing under control of said readings. The one reading means controls the printing of data identical to the data present in the storing device; the second reading means inverts the reading of the device and controls the printing of a complement of the data read; and a third reading means is adapted to change the reading of a portion of the device to control the printing of a different complement of the data read.

An object of the invention is to provide means for taking an inverted reading of an accumulating device and controlling a printing mechanism in accordance with the reading. The disclosed total printing devices are electrically controlled by timed impulses emitted at different times and directed to the printer through contact devices adjusted by a set of accumulating elements.

Another object is to provide a balance printing means for an accumulator having elements which at times stand complementarily to the true balance whereupon the printing means is controlled by impulses initiated by emitting devices and timed to give an inverted or complementary reading of the elements and thereby print the balance as a true number.

The invention is illustrated in connection with a perforated record controlled machine of the type disclosed in the patent to Daly et al., No. 1,762,145. In the machine the perforated records are fed under two sets of sensing brushes in electric circuits. When the cards pass the lower brushes, impulses directed through the perforations at differential times serve to control the actuation of a counter of the Hollerith type.

The accumulating devices are adapted to be controlled by record cards perforated in index positions representing true numbers, whether negative or positive in value. Both debit and credit items are represented as true numbers on the cards, the one class of items being subtracted from the other by automatic conversion to complements. The debit cards do not have to be perforated with a complement; the machine automatically changes such items during accumulation.

Addition is performed in the usual way by the timed energization of counter magnets controlling the clutch connections to the counter elements. The cards carrying a debit or negative item have a special perforation which registers with one of the upper brushes to close a subtraction control circuit and condition the accumulating devices for the addition of the complement of the number on the card instead of the addition of the true number.

The subtraction devices shown and described are set forth in application Serial No. 584,930, filed January 6, 1932, by C. D. Lake.

In subtraction, the regular counter magnets are energized early in the operating cycle, and the counter elements move to add the complement of the negative number present on the record card. By the time a perforation in the card reaches the sensing position the related counter element has added the complement of the number represented by the perforation on the card. The counter element is then ready to be declutched. The declutching operation is initiated by an impulse directed through the perforation in the card to energize a counter release magnet. The armature of this magnet is connected to a throw-out pawl which in turn is connected to a related counter clutch lever. When the pawl is moved by the magnet it is pulled in the path of teeth on a rotating shaft. The positive movement of the shaft is transmitted through the pawl to the clutch lever which is then swung clear, disengaging the clutch and releasing the counter element.

After the entry of credit and debit items the accumulator contains a balance. If the credit amounts total more than the debit amounts, the positive balance is present in the accumulator as a true number. If the debit amounts sum up to more than the credit amounts the negative balance is represented in the accumulator by its complement. The devices of the present invention are concerned with the inverting of the complement in the accumulator during the taking of a total with a negative balance, in order to print a true number equal to the negative balance.

The devices for inverting a complement in the accumulator during total taking include a pair of impulse emitters operated in synchronism with the movement of the printing members and effective to stop the members in printing position by means of impulses initiated at differential times. The emitted impulses pass through devices adjusted by the accumulator and are selected according to the number it contains. Each denominational order accumulator element is provided with a pair of brushes contacting commutators connected to the emitters.

The brushes are set by the related element according to the number accumulated. The one emitter is adjusted to emit impulses causing the printer to register the nines complement of the number in the accumulator. The other emitter is adjusted to emit impulses controlling the printer to register the tens complement of the number in the accumulator.

In addition to the two emitters mentioned, another regular emitter is provided. It is designed to emit impulses controlling the printer to register the number contained in the accumulator. By means of this regular emitter a record is made of a positive balance when the accumulator holds such a credit balance. The highest order accumulating element is provided with devices for determining whether the accumulator holds a negative or positive balance and to accordingly select the two impulse emitters for inverting the negative balance during total printing, or the emitter for taking a straight reading of a positive balance.

The accumulating elements are provided with means whereby the units order, the order containing the first significant figure on the right of a number contained in the accumulator, and any orders to the right of the first significant figure are adapted for selecting emitted impulses corresponding to the tens complement of the number registered on said lower order wheels, while the remaining higher order wheels are adapted to control the direction of impulses to the printing means timed to cause the printing of the nines complement of the number standing on the higher order wheels. For example, it may be assumed that after a series of credit and debit entries, the number 999,942,700 is held by the accumulator and indicated on the accumulator wheels as a negative balance. When the highest order is tested early in a total taking operation, the presence of a "9" in the order indicates that the balance is negative and represented by a complement. Then in order to print the balance as a true number, the three lower order figures printed must be the tens complements of the numbers in the corresponding orders of the accumulator, and the six higher order figures must be changed to the nines complements of the numbers stored in the related orders of the accumulator.

The number 57,300 which is printed under control of the total taking devices of the present invention, is the true negative balance.

Other objects, uses and advantages of the present invention will be hereinafter pointed out in the specification and claims, and shown in the drawings, which show by way of illustration what is now considered to be the preferred embodiment of the invention.

Figure 8:
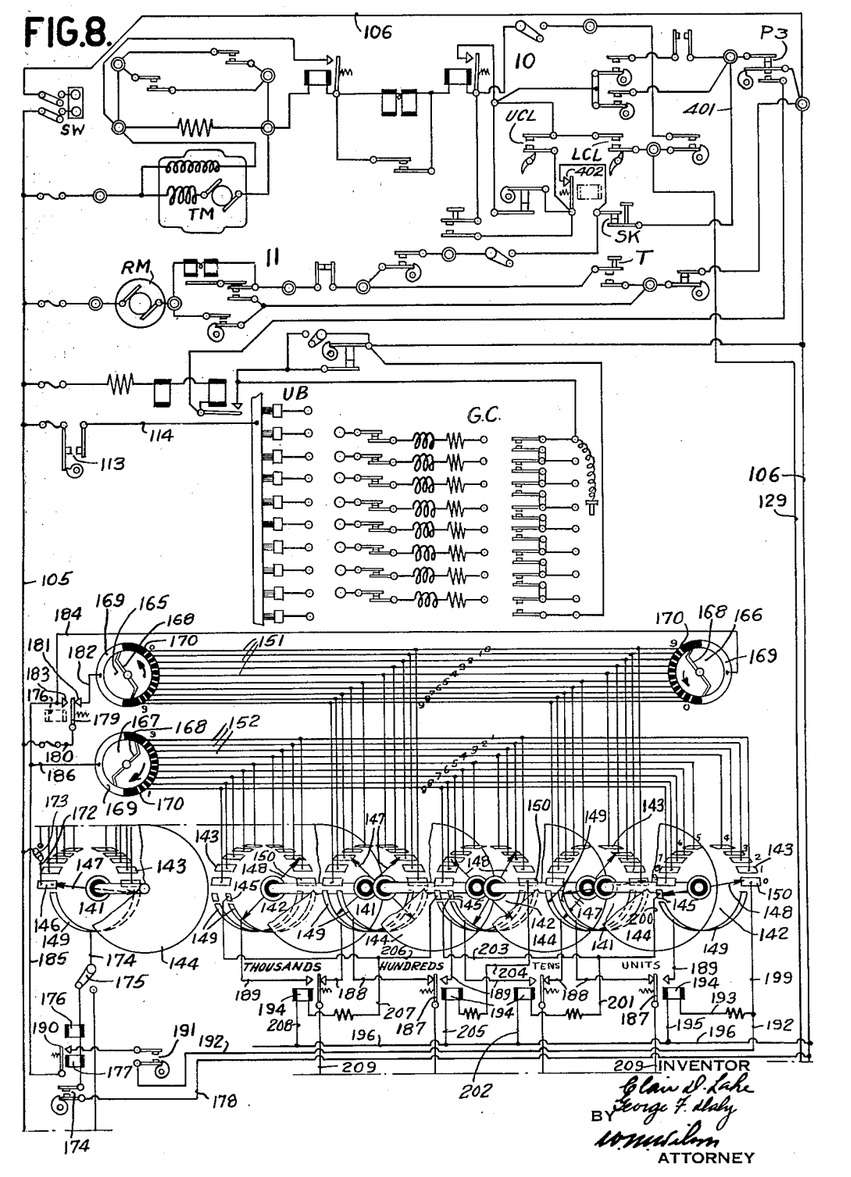
Figs. 8 and 8a taken together form the wiring diagram of the machine.
Figure 8A:
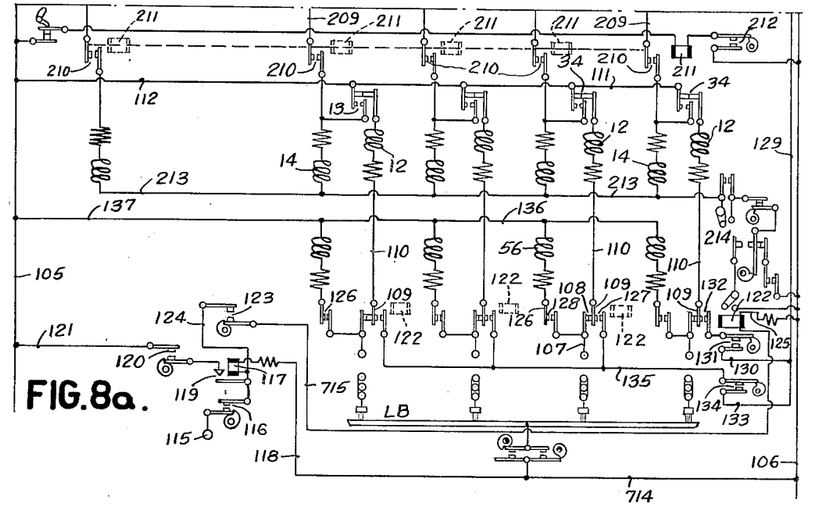

The diagram in Fig. 8, with the exception of the wiring of the counter mechanism, is similar to that shown in the patent to Daly and Page, previously referred to. An elementary form of counter construction and wiring is shown in British Patent No. 356,304. During adding operations the machine is driven by a tabulating motor TM controlled by a group of cam and relay controlled circuits indicated at 10, and is driven during total taking operations by a reset motor RM controlled by a group of circuits, contacts and relays designated generally at 11. The depression of the total key T conditions the reset motor for operation. When the tabulating motor TM is in operation it feeds the usual perforated tabulating cards, bearing differentially arranged index points representing digits, first, beneath the upper analyzing brushes UB and exactly one machine cycle later beneath the lower analyzing brushes LB (Fig. 8a). By means of the group control mechanism indicated generally at GC, groups of cards, as represented by the same data entry in certain selected columns, may be operated upon separately, the items of each group being accumulated and the total of them taken before the machine begins operation on the following card group.

As the perforated cards pass the lower brushes their index points instantaneously close circuits through the proper lower analyzing brushes LB to energize counter magnets 12. The timed energizations of these magnets control mechanism for entering the data corresponding to the card reading on the counter wheels. When any counter magnet 12 is energized it causes contacts 13 to close energizing a printer magnet 14 to select the type corresponding to the entered data for printing. In this fashion the items may be listed as accumulation is carried on in the use of the machine for ordinary adding. When used for subtracting the machine may be conditioned for tabulating control to eliminate the printing of items and thereby print totals or balances only.

Figure 1:
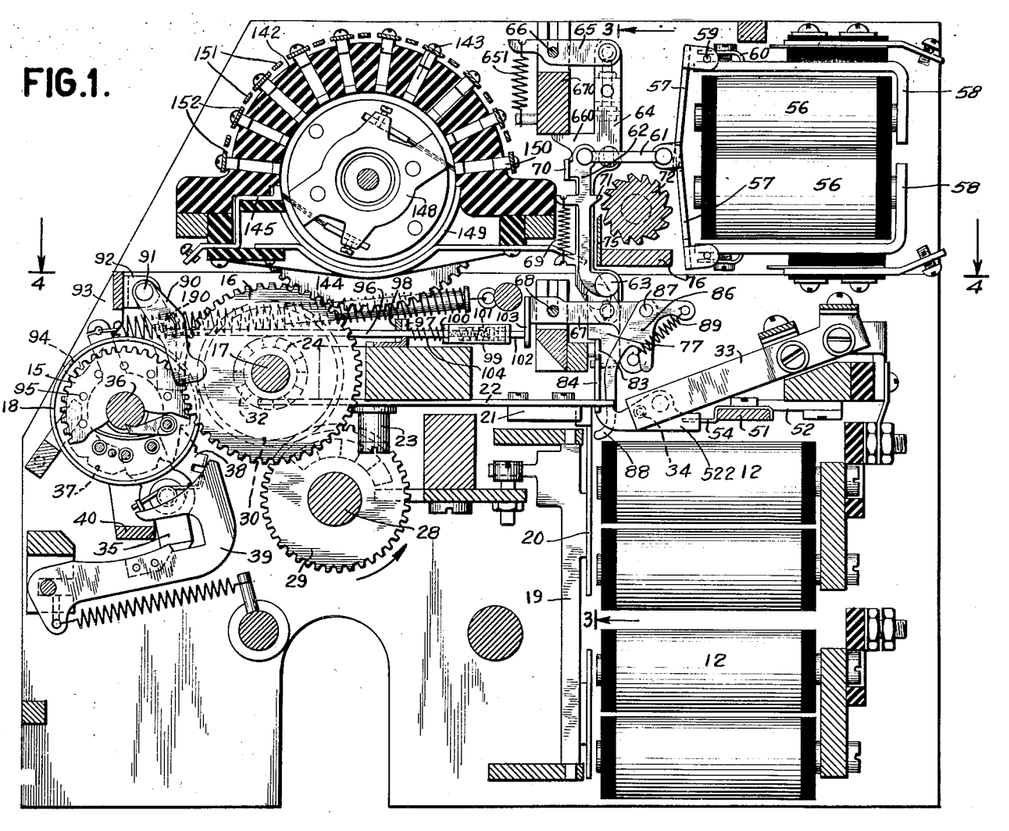
Fig. 1 is a sectional elevation view of the accumulating mechanism showing the total taking commutator and brush devices.
Figure 4:
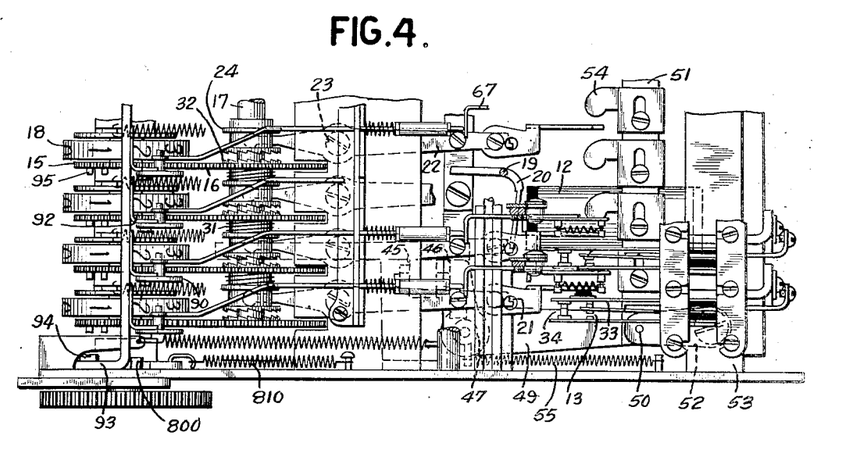
Fig. 4 is a plan view of the bottom section of the accumulating mechanism viewed as indicated by line 4—4 in Fig. 1.
Figure 5:
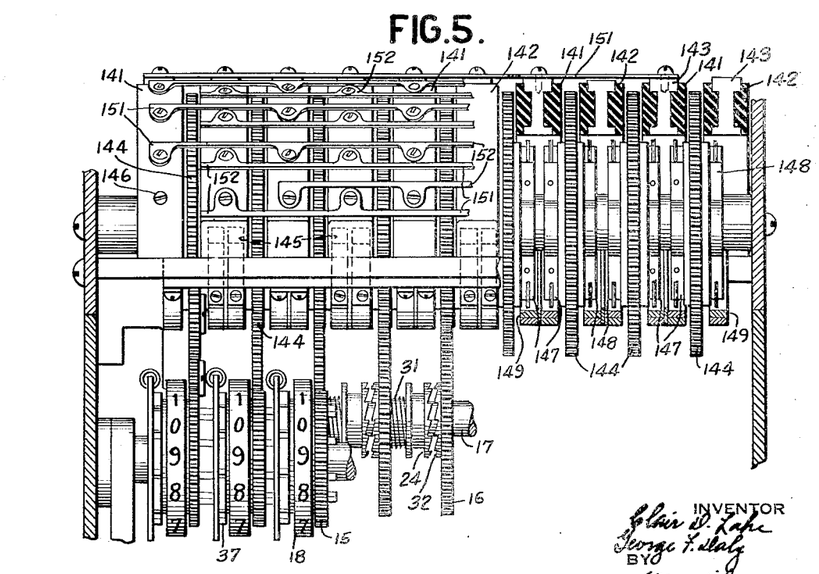
Fig. 5 is a front elevation view of the top of the accumulator with a portion of the device in section showing the brushes mounted on the accumulator gears, and the commutator segments with which the brushes cooperate.

Referring to Figs. 1, 4, and 5, the accumulating or counter gear wheels 15 are in mesh with gears 16 driven by a shaft 17 under control of the counter magnets 12. The indicating wheels 18 are fixed to the counter elements so that the data entered in the counter may be visually indicated.

There is a controlling magnet 12 (Fig. 1) for each register wheel 16 and the magnets are arranged in two horizontal rows staggered in position. Coacting with each magnet is a vertical rod 19 (Fig. 1, 3, and 4) pivoted on the frame and carrying an armature 20 facing the magnet pole. An extension on this pivoted armature structure engages a stop 21 at the outer end of a clutch lever 22 pivoted on a screw 23. The other end of the clutch lever is splined to clutch collar 24 (Fig. 4) rotatable with shaft 17 constantly driven by the tabulating drive shaft 25 (Fig. 2) through a train of gearing comprising gears 26, 27, shaft 28, gears 29 and 30 (Fig. 1). Upon energization of magnet 12, armature 20 is attracted and oscillates on the frame so that the extension disengages the stop 21 on the clutch lever. The latter being unlatched, permits coil spring 31 (Fig. 4) to move the clutch collar teeth into mesh with coacting teeth 32 on the gear 16 freely rotatable on shaft 17, whereupon gear 16 starts to rotate and through the gear 15 on the counter wheel turns the counter wheel on its shaft.

The right end (Fig. 4) of the clutch levers when latched engage flat springs 33 which constitute one member of contacts 34. When unlatched, the clutch levers permit the springs 33 to move outwards opening contacts 34. When closed these contacts establish the card sensing circuits. They open to prevent arcing at the sensing brushes.

As in the patent referred to hereinbefore, the magnets 12 are energized at a point in the cycle proportional to the value of the designation on the ordinary Hollerith card. The designations are usually in the form of perforations variously located from a given datum line in fixed index positions. The value of a perforation is fixed by its index position. As the card feeds past the analyzing brushes, the positions successively reach the brushes at correspondingly successive points of the cycle. When a perforation encounters the brushes, the latter contact therethrough and complete a circuit energizing magnet 12 at a time proportional to the value of the perforation.

The energization of the magnet effects rotation, in the manner described, of the corresponding counter wheel which turns an amount corresponding to the value of the perforation. For example, if a "9" perforation be sensed by the brushes, the wheel will rotate through nine digit spaces. If the wheel initially reads "0", after rotation through nine digit spaces it will read "9". However, if the wheel initially reads "2", after rotation through nine digit spaces, it will read "1" and hence a transfer must be effected to the counter wheel of the next higher denominational order to turn the latter one digit space.

The transfer devices (Fig. 1) are of a well known form, including levers 35 mounted on counter shaft 36, one lever alongside each counter cam wheel 37. A pawl 38 on lever 35 cooperates with the cam and when operated by a high point on the cam when the wheel passes from nine to zero, serves to depress a latch arm 39 normally holding the higher order lever 35 in retracted position. The released lever carries the attached pawl 38 to the left one step around the notched wheel, in position to be operated by the bail 40 through connections effective at the proper time after adding.

Figure 2:
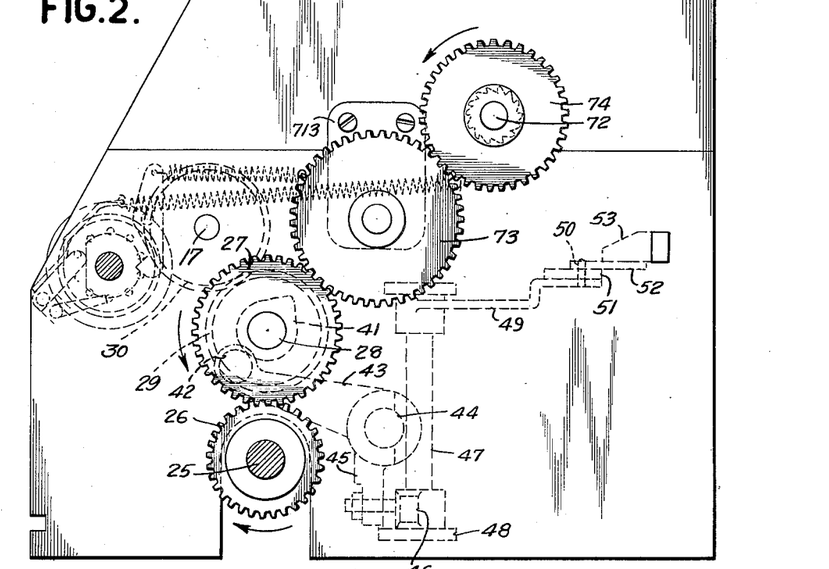
Fig. 2 is a side elevation view of the accumulating mechanism showing the gear connections between the driving shaft and the accumulator control shafts.
Figure 3:
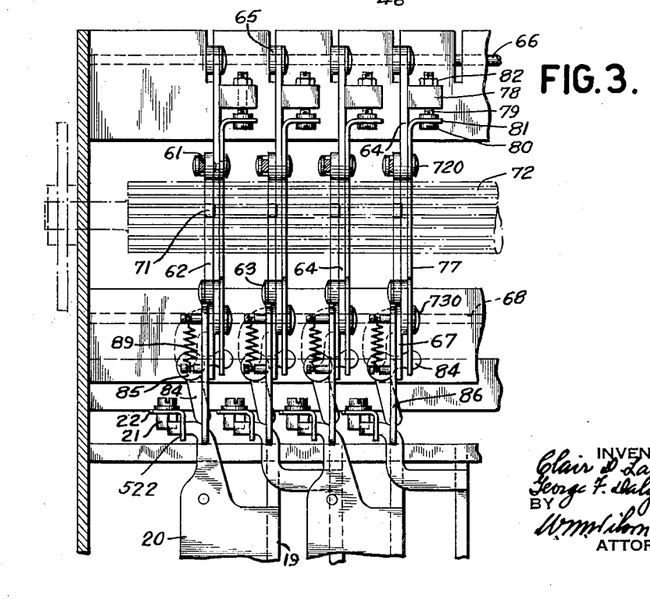
Fig. 3 is a sectional elevation view taken along line 3—3 in Fig. 1 and showing the mechanism for declutching the counter elements in subtraction.

As pointed out, the clutch levers 22 are selectively unlatched by armatures 20 upon energization of the magnets 12 during the adding cycle. At the end of the adding cycle, the released clutch levers must be relatched by the armatures to thereby disengage clutch collars 24 from the counter wheel actuating gears 16, and thus stop rotation of the counter wheels. The relatching operation is effected at the end of each card cycle by the following mechanism:

Referring to Fig. 2, coacting with a cam 41, rotated once per card cycle from the main shaft, is a follower 42 mounted on one arm of a bell crank 43 pivotally mounted on shaft 44. Cam 41 has a projection designed to give said bell crank 43 a thrust after each adding operation to move said bell crank in a counterclockwise direction. The other arm 45 of the bell crank bears against an extension 46 fixed at an angle to the vertical shaft 47, Figs. 2 and 4, rotatably journalled in the frame 48.

At the opposite end of the aforementioned shaft 47 is fixed an arm 49 pivoted by means of pin 50 (Fig. 4) to one end of a flat bar 51 extending the width of the counter. Pivotally connected to each end of bar 51 are similar links 52 which are pivotally mounted on the frame on brace rod 53.

A plurality of similar members 54 adjustably mounted on bar 51 are provided with projections adjacent the free ends 522 formed as part of the clutch levers 22, as shown in Fig. 4, there being a member 54 for each clutch lever. When cam 41 (Fig. 2) rocks the bell crank 43 counterclockwise, arm 45 thereof engages extension 46 rotating shaft 47 clockwise (Fig. 4) against the resistance of a spring 55. Arm 49 fixed to shaft 47 thereupon actuates bar 51 downward, as viewed in Fig. 4, with the result that the projections on members 54 move towards clutch levers 22 and press against the ends 522 of those clutch levers which have been unlatched, moving the stops 21 on said levers behind armature latches 20 which thereupon engage the stops to relatch the levers. This relatching action occurs at the end of the adding cycle.

It is noted from the foregoing description that adding operations are performed by establishing a clutch connection between collar 24 and teeth 32 to drive an accumulator wheel 15 at the instant when a perforation is in registration with the correlated analyzing brush LB and continuing such a clutched relation until the end of the cycle. For example, if a "two" perforation is analyzed, the clutch connection is established at the "seven" point in the cycle and opened at the "nine" point to cause an entry of two units on the related accumulator wheel.

Subtracting operations are effected by the complemental process based upon the theory that one number may be subtracted from the other by the addition of the true complement of the subtrahend. In record controlled machines, it is desirable that the perforated data represent only the true number of an amount to be subtracted because in certain tabulating operations it may be desirable to employ such cards for adding amounts as well. Therefore negative or debit amounts are represented on the cards by perforations indicating the true amount instead of the complement.

The conversion of the true numbers to true complements is automatically effected by the machine. In the event that the perforation represents a value of two it will be recognized that the "nines" complement or seven units must be entered into the adder unit to subtract by the complemental process. In the present machine such operations are taken care of for all orders above the units by energizing all the accumulator magnets at the beginning of the cycle so that the clutch devices will immediately cause the accumulator element to be turned. Such rotation continues until a perforation is analyzed, causing energization of a subtraction magnet and disestablishment of the clutch connection. As this is the point at which the clutch device is rendered effective in ordinary accumulating operations it will be understood that the adder element receives a complemental entry. The structural details whereby the clutches are rendered ineffective at differential times coincident with the perforations reaching the analyzing brushes may best be understood by reference to Figs. 1, 3, and 4.

As shown in Fig. 1 the subtraction magnets 56 are arranged in two rows in order to place a plurality of them in a limited space. The armatures 57 cooperating with the magnets are pivoted alternately at upper and lower points on the magnet support frames 58 to avoid interference with each other. The pivot rod 59 for the armature lies in a notch cut in the bracket supporting frame 58 and is held in position by a removable clip 60. To the end of each armature is pivotally secured one end of a link 61 the other end of which is pivoted to the top of pawl 62. This pawl is pivoted at 63 on the side of a long link 64 suspended between an upper arm 65 pivoted at 66 and a lower arm 67 pivoted at 68. The rods 66 and 68 lie in slotted frame members and are removable with the top of the counter. A spring 651 urges arm 65 in a counterclockwise direction and lifts link 64 until an extension 660 engages frame 670. A spring 69 is stretched between projections on pawl 62 and link 64 to urge the pawl in a counterclockwise direction, holding the upper end of the pawl against a lug 70 on the side of the link 64. From the other side of the pawl there projects a tooth 71 adapted to cooperate with a rotating ratchet gear or notched shaft 72.

The connections for driving the notched shaft may be noted in Fig. 2. There it is noted that an idler gear 73, removably mounted on bracket 713, meshes with the gear 27 already mentioned and also meshes with a gear 74 fastened to the end of the notched shaft 72. The gearing connections between the clutch driving shaft 17 (Fig. 1) and the ratchet gear 72 are so proportioned that the two shafts move in synchronism, Fig. 2, gears 27 and 74 being of the same size and gears 29 and 30 being equal in diameter. The clutch hub 24 is provided with the same number of teeth as the ratchet gear 72.

The ratchet shaft is rotated continuously during the accumulating operation. At that time, should any of the magnets 56 be energized, the related pawl 62 is drawn into cooperation with the ratchet teeth on the rotating shaft. The tooth 71 on the pawl is then pushed downwardly until the lower camming surface on the tooth cooperates with a vertical plate 75 adjustably mounted by a screw and slot connection (not shown) on a stationary bar 76. Thus, the pawl is automatically cammed out of engagement with the ratchet. The downward movement of the pawl 62 is transmitted through the connection to link 64 to a slide 77 (Fig. 3) mounted on studs 720 and 730 on the side of link 64. Between the link and the slide there is provided the adjustable connection shown in Fig. 3. There it is noted that the tapped stud 78 mounted on the side of link 64 holds a threaded adjustment screw 79 having a shouldered head 80 into which extends the forked end 81 of the slide 77. A screw slot in the top of the screw makes easy the vertical adjustment of the slide 77; the adjustment once made is held by the lock nut 82.

The lower end of the slide 77 is provided with a notch 83 (Fig. 1) which confines one end of a bell crank 84 (Fig. 3) pivoted at 85 on a stationary portion of the counter frame. The lower vertical arm of the bell crank 84 reaches alongside a related clutch lever 22 and is in contact with the clutch lever when it is released from the armature 20 to move the clutch bushing 24 into cooperation with clutch teeth 32.

When the slide 77 is lowered through the connections already mentioned, the bell crank 84 is rocked in a clockwise direction (Fig. 3) and acts to swing the clutch arm to the left until the latching block 21 on the clutch lever is in position to be latched by the armature 20.

To ensure the latching of the operated clutch levers an armature knock-off member 86 is pivoted at 87 on the supporting arm 67. When the link 64 is lowered the supporting arm 67 is rocked in a clockwise direction about pivot 68 carrying along member 86, the lower end 88 of which contacts the side of the armature 20 (Fig. 1) acting to overcome any residual magnetism holding the armature against magnet 12, and forcing the armature into clutch lever latching position.

A spring 89 connected between member 86 and a stud on arm 67 serves to hold the member 86 in position, and also provides a yielding connection between the positive clutch lever operating linkage and the armature positioning means.

The positive actuation of the ratchet gear 72 also serves, through connections about to be described, to position overthrow preventing pawls 90 (Fig. 1) pivoted at 91 on ears 92 extending from the side of the bail arm 93 pivoted on screw 94, Fig. 4, on the side of the counter frame. Each pawl 90 cooperates with a set of pins 95 extending from the side of one of the accumulator gear wheels 15. When the accumulator wheel is rotated in its normal counterclockwise direction, the pins 95 pass the end of the pawl 90 in succession. An operation of the pawl places it between a pair of pins and tends to hold the index wheel in one of its digit indicating positions. Should the wheel continue to rotate positively, the pawls will not interfere because the bail 93 is loosely mounted on screw 94, Figs. 1 and 4 and allows an upward movement of the pawls 90. A tendency of the wheels to rotate, due only to momentum, is prevented by the pawls.

A spring 810 (Fig. 4) holds the bail in normal position against pin 800. The stud 190 (Fig. 1) on the pawl 90 pivotally supports one end of a rod 96 the other end of which is guided by bracket 97 and held in position by a slotted plate 98. The extreme end of the rod 96 is threaded and screwed into a cylinder 99 and held against the same by a lock nut 100.

In the cylinder is a spring 101 pressing against one end of a plunger 102, the other end of which abuts against an extending flange 103 on the front end of the link 67. When the link 67 is rocked by the actuation of the pawl 62 by ratchet 72, the lower end of flange 103 is moved to the left (Fig. 1) pushing against plunger 102, moving the rod 96 through spring 101, and carrying the overthrow pawl 90 into cooperation with the related accumulator wheel. A light spring 104 on rod 96 pressing between the bracket 97 and the nut 100, normally holds the overthrow pawl out of locking position. It is noted that by turning lock nut 100 and cylinder 99 the rod 96 may be extended horizontally adjusting the position of the pawl 90.

From the above description it may be gathered that during a subtracting operation when an impulse is directed through the subtraction magnet 56, a pawl 62 cooperates with the ratchet wheel 72 and through the connections described the clutch connection driving the related counter element is disabled, and the clutch lever is latched by the associated armature which is moved by the knock-off member, and at the same time an overthrow pawl is positioned to hold the released counter element in its last adjusted position after the entry of a complement.

Turning now to the wiring diagram shown in Figs. 8 and 8a to describe the manner in which impulses are directed through the magnets 12 to control an adding operation, and how impulses are directed through magnets 12 and 56 to control a subtraction operation. When the switch SW is closed, a circuit is established through the lines 105, 106.

During adding operations at a differential point in the analysis of the card an impulse may be directed from the right side of the line 106, wire 714, through any of the lower brushes LB (Fig. 8a), a plug wire to wire 107, through contacts 108 and contact lever 109, wire 110, counter magnet 12, contacts 34, bus bar 111, and wire 112, to the other side of the line 105. As explained hereinbefore, this impulse energizes magnet 12 which in turn moves the armature 20 releasing the clutch lever 22 and engaging the related counter element with the driving means until the end of the adding operation when the clutch connection is disengaged by the operation of projections 54 (Fig. 4). The differentially timed impulses from the lower brushes follow a different course in subtraction, because then the contact levers 109 are shifted before the sensing of a debit card by the lower brushes.

In order to condition selection devices for subtraction operations, the record cards carrying a negative or debit number are provided with a special perforation, usually in the "11" index position. Cooperating with the card column containing this perforation is one of the upper brushes. Through the upper brush, electrical connections are made to hold the switching contact levers 109 and 126 in an operated position to change the manner of controlling magnets 12 and also to direct the differentially timed impulses into subtraction magnets 56 through shifted contact levers 126.

The wiring connections for the subtraction conditioning control are as follows: From line 105 (Fig. 8) through contacts 113, closed during card analysis, wire 114, the upper brush cooperating with the column containing the special perforation, a plug wire to jack 115 (Fig. 8a), contacts 116, closed as the special index point passes the analyzing position, through magnet 117 and wires 118 and 714, to the other side of the line 106.

When an impulse is directed through relay magnet 117 the associated contacts 119 are closed and when another set of contacts 120 are closed mechanically before the opening of contacts 116, a holding circuit is established running from line 105, through wire 121, contacts 120, relay contacts 119, magnet 117, and wire 118, to the other side of the line. Arranged in parallel with the magnet 117 is a magnet 122 which controls the positioning of the contact levers 109 and 126. The contacts 123 arranged in series with the magnet 122 are closed before the card carrying the subtraction item is presented under the lower analyzing brushes. When these contacts are closed the magnet 122 is held energized by means of the connections through wire 121, contacts 120, contacts 119, wire 124, contacts 123, wire 715, magnet 122 and wire 125 to the line 106. After the record card passes the zero position, contacts 123 are opened deenergizing the subtraction control magnet 122. Just before the special index hole reaches the analyzing position under the upper brushes, the contacts 120 are opened to deenergize the relay magnet 117 and condition it for testing the record being sensed to determine whether it carries a positive or negative number.

When the subtraction control magnet 122 is energized it serves to open the contacts 108 normally directing the differential timed impulses from the lower brushes into the adding counter magnet 12, and closes contacts 127 to energize the counter magnets 12 at the beginning of the adding operation. The control magnet 122 also shifts switch levers 126 to close contacts 128 having connections to the lower brushes in order to direct the differentially timed impulses through the subtraction magnets 56. The contact levers 109 and 126 are movable and may be shifted by the energization of magnet 122, but the other contact levers cooperating therewith are fixed and held in position at all times.

During subtraction operations the lowest order counter magnet 12 is energized one point before the other magnets in order to add the "elusive one" and complete the complement. The units order magnet 12 is energized one point before the nine index position on the card is beneath the lower brushes at what may be called the "10" position, and the other higher order magnets are energized at the nine position.

The units order counter magnet is energized by means of the following connections: From the right side of line 106, contact P3, wire 401, stop key contacts SK, contacts 402, upper card lever contacts UCL, through contacts LCL (Fig. 8) closed by a card under the lower card lever, wire 129, wire 130 (Fig. 8a), contacts 131 closed at the "10" position, contacts 132, contact lever 109, wire 110, counter magnet 12, contacts 34, bus bar 111 and wire 112 to the line 105.

The higher order counter magnets are energized through wire 129, wire 133, contacts 134 closed at the "9" position, bus bar 135, contacts 127, contact levers 109, wires 110, counter magnets 12, contacts 34, bus bar 111 and wire 112 to the line 105. With all the counter magnets thus energized at the beginning of the subtraction operation, the clutch levers 22 are tripped closing the clutch connections between the counter elements and driving means, the accumulator wheels start to rotate and continue to move until they are individually declutched by the positive actuation of the clutch releasing devices shown in Fig. 1.

The wiring connections about to be described control the energization of subtraction magnets 56 which in turn control the positive declutching mechanism. In a subtracting operation, since the movable contact levers 109 and 126 are shifted (Fig. 8a) by the control magnet 122, the contacts 108 are opened breaking the connection between the lower brushes and the counter magnet 12 while the contacts 128 are closed making a connection betwen the lower brushes and the subtraction magnets 56. An impulse directed through a lower brush under control of the record card during a subtraction operation goes from the lower brush through a plug wire, wire 107, contacts 128, contact lever 126, magnet 56, bus bar 136 and wire 137 to the other side of the line 105.

The various magnets 56 are energized at differential times according to the position of the perforations in the related columns on the card. The energized magnet 56 acts to throw the pawl 62 into cooperation with the ratchet wheel 72 (Fig. 1) and through the positive drive connection, described hereinbefore, the associated counter wheel is declutched at the differential point, thus stopping the counter element after the entry of the complement of the number represented on the record card in the related column.

In Fig. 8a one counter is shown comprising four banks or orders of accumulating elements. It is obvious that the principle of operation may be expanded to actuate accumulators having a larger number of orders and also that a larger number of accumulators may be provided in the machine.

Figure 6:
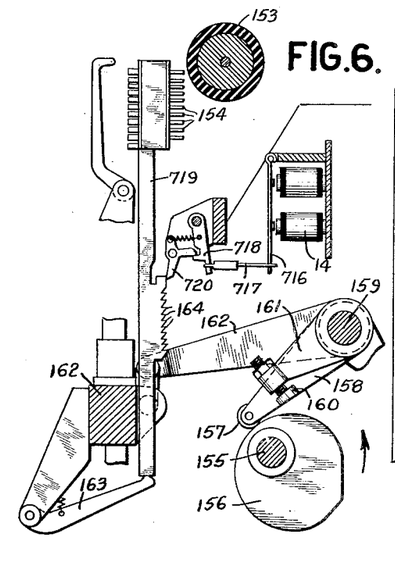
Fig. 6 is a side elevation view of the printing mechanism.

It is noted hereinbefore that printing of items is initiated during ordinary adding operation by differentially timed impulses directed through printing magnets 14 at the same time that magnets 12 are energized. In Fig. 6 it is shown that armature 716 of each printing magnet 14 is connected by a call wire 717 to a pawl 718 which is adapted to release pawl 720 and stop a type bar 719 in one of its printing positions. By means of connections from the motor TM the type bar is moved in synchronism with the feeding of the record card under the sensing means, and thus the impulse is directed through printing magnet 14 at the same time that magnet 12 is energized. The impulse being timed by the differentially located perforation, acts through the printing magnet to stop the type bar in a position to print the numeral corresponding to the index value of the perforation.. Since the printing structure used is well known in the art and disclosed in Patent No. 1,762,145, no further explanation of its operation in listing is thought necessary. The devices of the present invention adapted to control the printing of totals are described hereinafter.

After the entry of credit and debit items into the accumulator it is desirable to print a total to record the balance indicated on the accumulating wheels. The balance is present in the accumulator as a true number or as a complement according to which class of items predominate. In other words if the amounts added are greater than the amounts subtracted, the balance is in the accumulator as a true number; if conditions are reversed, the balance is shown as a complement of a true negative number. Examples of such credit and debit balances are shown in the operation outline in Fig. 7.

Figure 7:
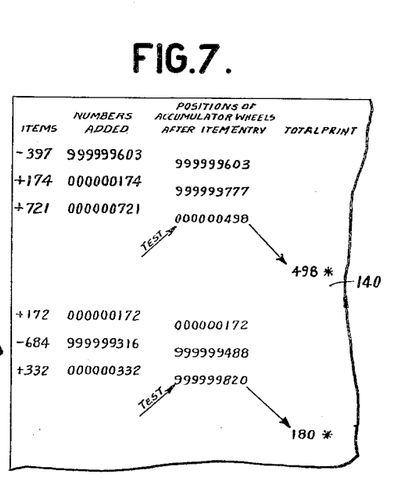
Fig. 7 is a chart showing the positions of the accumulator wheels and the data printed as a result of a series of item entering and total taking operations.

In the second column from the right, the third number shows the positions of the accumulator wheels when holding a credit balance of 498 resulting from debit and credit item entries. The sixth number in the same column indicates the positions of the accumulator wheels when containing a debit balance. It is noted that the accumulator contains the complement 999,999,820 of the true debit balance 180. The total taking devices to be described are not only adapted to print the positive total 498, but also to print the negative total 180 corresponding to the complement.

The total taking mechanism shown in Figs. 1 and 5 includes two sets of commutators 141 and 142 provided with segments 143 corresponding in number and position to the several digit indicating positions of the counter wheel 15. It may be noted from the showing in Fig. 5 that the commutators are placed between gears 144 driven by the counter wheel drive gears 16, and that commutators 141 are interspersed between commutators 142. The commutators 142 are provided with special zero contact segments 145 (Fig. 1). The commutator 141 alongside the highest order gear 144 is provided with a special nine contact segment 146 (Figs. 5 and 8). The manner in which commutators 141 are used in reading out true numbers or inverting to nines complements, and commutators 142 are used to invert to tens complements, is fully described hereinafter.

A pair of brush structures 147 and 148 are mounted on each gear 144 driven by the gear 16 which drives the counter wheel 15 so that the brush structures are angularly displaced according to the number indicated on the counter wheel. Each structure carries two brushes, one of which engages the segments 143 and the other of which engages a long segmental conductor 149 having a surface corresponding to the configuration of the commutator. Referring to Figs. 5 and 8, it will be noted that wherever possible one commutator has been arranged to cooperate with two similar brush sets of different orders to conserve space and simplify the construction.

Because of the interspersed position of the commutators 141 and 142 between the gears 144, the brush structures 147 and 148 are reversed in position on adjacent gears 144 in the accumulator. For example, it is noted that on the right hand units order gear 144 in Fig. 5, brush structure 148 on the right of the gear cooperates with commutator 142 and structure 147 on the left cooperates with commutator 141, while in the next order, brush structure 147 is placed on the right of the tens order gear 144 in order to cooperate with commutator 141, and structure 148 on the left contacts with commutator 142. The construction is also shown diagrammatically in the lower portion of Fig. 8.

When any of the counter wheels stands in zero position the related brush structure 148 is positioned as shown in Fig. 1 with one brush contacting segment 145 and the other brush contacting a segment 150. With the parts so positioned, part of an electric connection is established for the selection of a tens complement reading of the next higher order while the still higher orders are read for nines complements during the taking of a negative total in a manner fully described hereinafter. In all of the other positions of brush structure 148, one brush contacts a segment 143 and the other brush touches conductor 149. The commutators 147 are not provided with zero contacts such as contacts 145, so that brush structure 147 in all positions stands with one brush on a segment 143 and the other brush contacting a conductor 149.

On commutators 141 (Fig. 5) each group of segments corresponding to the same digit are connected to a common conducting bar 151 whereby all the "9" segments are in multiple, all the "8" segments in multiple, etc., see Figs. 1 and 8. The segments on commutators 142 are connected in a like manner by other common conducting bars 152. The set of bars 151 is used to direct timed impulses through commutators 141 and the printing magnets 14 in order to take a true reading or a nines complement reading of the accumulator wheels during total taking. The other set of bars is used in taking tens complement readings. Before considering the devices for directing printer controlling impulses through the bars, commutators, brush structures and printer magnets 14, the printing mechanism shall be described.

In Fig. 6 is shown the printing mechanism by means of which the type bar 719 is positioned relatively to the platen 153 to bring the proper type 154 into printing position opposite the platen. The total shaft 155 driven by the reset motor RM in Fig. 1 is provided with a cam 156 cooperating with a roller 157 carried on arm 158 freely rotatable on shaft 159. As the cam rotates arm 158 rocks clockwise and a lug 160 cooperating with an arm 161 fixed to shaft 159 also rocks clockwise. An arm 162 fixed to shaft 159 is linked to printing crosshead 162 which serves to raise the type bar 719 in synchronism with the total taking operation so that the type 154 successively pass printing position opposite platen 153. Owing to spring operated scissors connections 163, however, the type bars 719 may be arrested in any printing position without interfering with the upward movement of the crosshead. Each type bar is arrested under control of a related printing magnet 14. When this is energized it attracts its armature 716 and pulls a call wire 717 to the right thereby releasing a latch member 718 normally holding stop pawl 720. When the pawl 720 is so released it is spring operated to engage ratchet teeth 164 formed on the type bar 719 to prevent further upward movement of the type bar thus holding a particular type 154 in printing position. The type for printing "9" is near the top of the type bar, therefore if an impulse is directed through magnet 14 early in the totaling operation, the type bar is stopped in a low position with the "9" type opposite the printing line. The other types are arranged in order on the bar with the "0" type at the bottom.

The three devices 165, 166, and 167 shown in Fig. 8 are for emitting timed impulses synchronized with the movement of the type bars 719 to select the type for printing. These emitters are similar in construction so that a description of one applies as well to the others. Each emitter contains a brush holder 168 suitably mounted on the total shaft 155 (or a shaft geared thereto) so that it rotates in synchronism with the rise of the type bars 719 during total taking.

The brush holder is provided with two brushes cooperating with a circular insulated shell fixed in the machine. The shell contains a contact segment 169 and a series of individual contact spots 170 arranged around the shell so that as one brush on the holder successively engages the contact spots the other brush is in contact with the segment 169. The spots 170 are displaced from each other circumferentially, the circumferential spacing being such that the brush reaches each spot as the type 154 corresponding to it on type bars 719 are passing printing position.

As shown in Fig. 8 the contact spots in emitter 165 have separate electrical connections to the ends of bars 151, and to the other ends of said bars are connected the contact spots in emitter 166. The numerals 0 to 9 placed directly on the bars are indicative of the digit values of the segments 143 to which the respective bars are connected. From the position of the brush holders, and the arrows showing direction of rotation in emitters 165 and 166, it is apparent that the brushes in the two emitters are timed to contact the spots in an inverted manner. The brush in emitter 165 contacts the spot 170 connected to the lower "9" bar 151 first, selecting the "9" type; the other spots are contacted in order with a contact on the connection to the upper "0" bar 151 last, selecting the "0" type. The brush in emitter 166 contacts the spot connected to the upper bar "0" bar first, selecting the "9" type, and the other spots in order; contacting the spot for the lower "9" bar 151 last. In this way impulses may be sent from emitter 165 through bars 151, commutators 141, and the printer magnets 14, to give a true reading of the standing of the accumulator elements; or, if emitter 166 is effective, it directs inversely timed impulses through the same connections to secure a print of the nines complement of the amount in the accumulator.

The contact spots 170 of the other emitter 167 are electrically connected separately to bars 152. The numerals 1 to 9 placed directly on bars are an indication of the digit value of the related segments 143 to which the bars are separately connected. The brush in emitter 167 is adapted to engage the spots 170 successively starting with the upper "1" bar 152 and ending with the lower "9" bar 152. The timing of emitter 167 is somewhat similar to the timing of emitter 166, aside from the fact that the brush in emitter 167 is advanced one step, in other words, as the brush in emitter 166 contacts the spot leading to the "0" bar 151, selecting the "9" type, the brush in emitter 167 contacts the spot leading to the "1" bar 152, selecting the "9" type.

Thus, emitter 166 is adapted to invert accumulator readings to nines complements and emitter 167 inverts to tens complements.

In Fig. 8 it may be noted that bars 151 connected to emitters 165 and 166 are associated with commutators 141, and bars 152 attached to emitter 167 are associated with commutators 142. During the taking of a positive total the emitter 165 is alone effective to send impulses through the accumulator and printer. For the taking of a negative total both the emitters 166 and 167 are effective, the one taking readings of higher order accumulator wheels and the other reading a lower order wheel. The selection of emitter 165 or emitters 166 and 167 is accomplished under control of the highest order accumulator wheel. If the wheel stands at "9" it indicates that the accumulator holds a negative balance in the form of a complement, and devices about to be described are effective to operate switches to effect emitter selection.

Leading from the "9" segment 146 (Fig. 8) on the highest order commutator 141 is a wire 172 connected by switch arm 173 to the left side of the line on wire 105. Early in a total taking operation the standing of the highest order wheel is tested by the closing of contacts 174.

If brush structure 147 is positioned by the wheel standing at nine, the connections continue through conducting segment 149, wire 174, switch arm 175, magnet 176, magnet 177, contacts 174, and wire 178 to line 106. Switch arms 173 and 175 are positioned as shown when balance selection control is desired. With the circuit completed as described, magnets 176 and 177 are energized. A contact lever 179 cooperates with magnet 176. Normally this lever closes a connection from line 105, wire 180, lever 179, contact 181, and wire 182 to the positive balance emitter. When attracted by the energized magnet 176, lever 179 breaks the connection with contact 181 and makes a connection with a contact 183, closing connections from line 105, through wire 180, lever 179, contact 183, and wire 184 to the nines complement negative balance emitter 166.

The operation of lever 179 serves also to connect emitter 167 to the line 105 by means of wire 180, lever 179, contact 183, wire 185 and wire 186 to said tens complement negative balance emitter.

The other magnet 177 when energized serves to condition devices for determining which orders of the printer are controlled by emitter 166 and which order by emitter 167 during negative balance printing. The emitter 166 sends impulses through the commutators 141 of the higher orders of the accumulator, while emitter 167 sends impulses through the units order commutator 142. If the units order wheel stands at zero, the impulses from emitter 167 are directed through the tens order commutator 142. Should a plurality of the lowest order wheels, beginning on the right with the units order wheel, stand at zero, the next higher order, which is the order containing the first significant figure on the right of the number in the accumulator, receives the impulses initiated by the tens complement emitter 167. Normally all the printer magnets 14 are connected to commutators 141 by means of contact levers 187 in contact with points leading by wires 188 to said commutators. Early in the taking of a negative total, one or more of these contact levers 187 are operated to break contact with wire 188 and make contact with a point on wire 189, thus connecting the related printing magnets to certain of the commutators 142. The devices for shifting levers 187 during negative total printing are as follows:

As explained hereinbefore, magnet 177 is energized early in a totaling operation when the accumulator wheel on the left stands at nine. The magnet then attracts a lever 190 and conditions a circuit reaching from line 105, wire 180, lever 179 concurrently attracted by the magnet 176, contact 183, wire 185, lever 190, contacts 191 closed during the recording portion of the machine cycle, wire 192, wire 193, magnet 194, wire 195 and bus bar 196 to line 106. Thus, units order magnet 194 is always energized early in the taking of a negative total to attract lever 187 and through the lever, connect wire 209, leading to the printer magnet 14, to wire 189 leading through commutator 142 to the tens complement emitter 167.

The energization of the magnets 194 associated with the tens, hundreds, etc., orders depends upon the position of the lower order wheels. If the lower order wheels, including the units order wheel, stand at zero, the next higher order magnet 194 is energized to effect connections to a commutator 142 for a tens complement reading. When this is done, the normal connection to the commutator 141 in line with the nines complement emitter 166 is opened, preventing the reception of a nines complement reading of a lower order wheel standing at zero. For example, since the units order wheel stands at zero in Fig. 8, the complement selection control circuit branches by parallel wiring from wire 192, through wire 199, segment 150, brush structure 148, contact 145, wire 200, wire 201, tens order magnet 194, wire 202 and bus bar 196 to line 106. By means of these connections the tens order magnet 194 is energized to shift its contact 187 and connect the related printing magnet 14 to the tens complement emitter 167 instead of the nines complement emitter 166. The same type of connection is provided for the other orders of the accumulator so that if they stand at zero, rather than being positioned as shown in Fig. 8, they are conditioned to select the tens complement emitter. Should the tens order wheel stand at zero, the circuit contains another branch line through wire 203, contact 145, brush structure 148, segment 150, wire 204, hundreds order magnet 194, wire 205 and bus bar 196 to line 106. If the hundreds order wheel should be positioned at zero, the circuit includes segment 150 in the tens order commutator 142 which is connected to wire 203 through the brush structure 148 on the tens order wheel. The circuit continues through brush structure 148 on the hundreds order gear 144, contact 145, wire 206, wire 207, thousands order magnet 194, wire 208 and bus bar 196 to line 106. In the same way the wiring connections for tens complement emitter selection continue to the left to the highest order of the accumulator. Thus, by the switching of levers 187, the tens complement emitter 167 is effective to direct impulses to certain of the lower order printing magnets during the taking of a negative total. The total printing connections, as shown in Fig. 8, continue down from switching levers 187 through wires 209 to the printing magnets 14 (Fig. 8a).

In order that there may be no possibility of the totaling circuits interfering with the listing circuits during ordinary adding operations, provision is made for entirely disconnecting the commutators and emitters from the printing magnets during listing operations. This consists of relay contacts 210, one pair being in series in the total printing circuits of each printing magnet 14. A group of these contacts 210 is operated from a coil 211 whose energization is controlled from cam contacts 212 operated from the total shaft 155.

During adding and listing operations contacts 212 are open but during totaling they close to energize the magnet 211 which energization results in the closing of associated relay contacts 210. The total printing connections from contacts 210 continue through printer magnets 14, bus bar 213, the group of contacts at 214 closed during total taking, and thence to line 106.

The complete operation will now be briefly summarized from Figs. 8 and 8a. Assuming first that the accumulator holds a positive balance, and that therefore lever 179 remains as shown making emitter 165 effective. The brush structures 147 during previous adding operations of the machine have been positioned according to the data reading of the associated adding wheels. Consequently one brush of the set rests upon a commutator segment corresponding to the reading of its wheel and the other brush rests on the segmental conductor 149 which is connected to the printing magnet 14 through relay contacts 187 and 210. The emitter 165 which is driven during total taking brings its brush 168 successively into cooperation with the spots 170 so that each of the bars 151 is adapted to receive an impulse at the time when the type corresponding to it is passing printing position. As the "9" spot 170 is touched by the brush 168 the printer magnet of each counter wheel which stands at "9" receives an impulse to select the "9" type for printing. The circuit extends as follows: From the left side of the line 105, lever 179, wire 182, conductor 169, brush holder 168 and thence through "9" spot 170 and bar 151 to all the "9" segments 143 of the commutators 141. If "9" is to be printed, a brush 147 will be in contact with this "9" segment and the circuit will be extended through brush structure 147 and segmental contact 149 to relay contact 187, thence through the contacts 210 (Fig. 8a) and printing magnet 14 and back to the other side of the line. In this fashion all type which are to print "9" will be positioned opposite the platen. The remaining type will be selected in similar manner according to the setting of the brush set 147 which corresponds to the counter reading. Thus in a single revolution of the emitter 165 all type which are to total print will be properly positioned opposite the platen to completely print the data represented on the several counter wheels.

Assuming that the accumulator holds a negative balance represented by the setting 999,992,730 of the wheels as illustrated by the position of the highest order and four lower order brush structures 147 and 148 on the accumulator wheels shown in Fig. 8, the lever 179 is operated, by connections already described, to select emitters 166 and 167. At the same time the units order lever 187 is operated and the tens order lever 187 is shifted because the units order wheel stands at zero. Thus, when magnets 194 are energized, the units and tens order printing magnets 14 are connected through wires 189, and commutators 142, to emitter 167. The higher order printing magnets remain connected by levers 187 in normal position, through wires 188 in the highest orders and commutators 141 to emitter 166. Considering first the two lower orders and the connections to the emitter 167. The brush structures 148 during the previous adding and substracting operations of the machine have been positioned along with structures 147 according to the data reading of the associated adding wheels. The emitter 167 which is driven during total taking brings its brush 168 successively into contact with the spots 170 so that each of the bars 151 receives an impulse at the time when the type corresponding to the tens complement of it is passing printing position. As the "1" spot 170 is contacted by brush 168 in emitter 167 the printer magnet of each counter wheel which is connected to emitter 167 and which stands at "1" receives an impulse to select the "9" type for printing. The circuit extends as follows: From the line 105, wire 180, lever 179, wire 185, wire 186, conductor 169, brush holder 168, thence through "1" spot 170 and bar 152 to all the "1" segments of the commutators 142. If "9" is to be printed, a brush 148 will be in contact with this "1" segment and the circuit will be extended through the brush structure 148 and segmental contact 149, wire 189, lever 187, thence through contacts 210 (Fig. 8a) and printing magnet 14 to the line 106. In this manner all type which are to print "9" will be positioned opposite the platen. The other type will be selected in a similar manner according to the setting of the brush 148 which corresponds to the counter reading. For example, in Fig. 8 the tens order brush 148 stands in the "3" position and is connected to select an emitted impulse to stop the related type bar in position to print "7".

The units order brush 148 as shown in Fig. 8 stands at zero out of touch with the conductor 149 and breaking the connection between the emitter 167 and the printer magnet 14. The magnet is not energized but the associated type bar rises to the uppermost position presenting a "0" type for impression, against the platen.

The higher orders and the connections to the emitter 166 will now be considered. During the taking of a negative total, the higher order commutators 141 and brush sets 147 are used just as in the taking of a positive total, the only difference being the employment of the nines complement emitter 166 instead of emitter 165 for controlling the timing of the impulses sent through bars 151. The emitter 166 is driven during total taking to bring the associated brush 168 successively into contact with the spots 170 so that each of the bars 151 is adapted to receive an impulse at the time when the type corresponding to the nines complement is passing printing position. As the "0" spot 170 is touched by the brush 168 the printer magnet of each counter wheel which stands at "0" receives an impulse to select the "9" type for printing. The circuit extends as follows: From the line 105, lever 179, wire 184, conducting segment 169, brush holder 168, through "0" spot 170 and bar 151 to all the "0" segments 143 of the commutators 141. If "9" is to be printed, a brush 147 will be in contact with this "0" segment and the circuit will be extended through the brush structure 147, contact segment 149 and wire 188 to relay contact 187, thence through the contacts 210 (Fig. 8a), printing magnet 14 and back to the other side of the line. In this fashion all type which are to print "9" will be positioned opposite the platen. The remaining type will be selected in similar manner according to the setting of the brush set 147 which corresponds to the counter reading. For example, in Fig. 8 the brush structure 147 on the hundreds order wheel stands at "7" therefore the "2" type is selected for printing in this order.

In the thousands order the brush structure 147 on the wheel stands at "2" and makes connections selecting the "7" type for printing. Thus in a single revolution of the emitters 166 and 167 all type which are to total print will be properly positioned opposite the platen to completely print the complement of the data represented on the several accumulator wheels. For the setting of the wheels as shown in Fig. 8, the number printed will be 7270 the true negative balance.

It will be understood that various omissions and substitutions and changes in the form and details of the device illustrated and changes in its operation may be made by those skilled in the art without departing from the spirit of the invention. It is intended to be limited therefore only as indicated by the scope of the following claims:

We claim:

1. In a machine of the class described, an accumulator comprising a plurality of denominational order elements for adding positive amounts and complements of negative amounts, electric circuits including contact devices set by said accumulator elements, impulse emitting members common to all elements for directing electrical impulses through said contact devices after they are set, and an electrically controlled printing mechanism for selectively printing true positive and negative balances under control of said impulses.

2. In a machine of the class described, an accumulator for adding credit items and complements of debit items, commutator devices adjusted by said accumulator, a pair of emitters for sending timed impulses through said commutator devices, the one emitter being adapted to send impulses at times corresponding to the setting of the commutators and the other emitter being adapted to send impulses at times complementary to the setting of the commutators, means for selecting one of the emitters for operation, a total printing device, and means for operating said printing device under control of the impulses emitted by the selected emitter.

3. In a machine of the class described, an accumulator for adding true numbers and complements comprising a plurality of accumulating elements, commutator devices adjusted by said elements, emitters for sending differentially timed impulses through said commutator devices to control total printing devices operating in synchronism with said emitters, the one emitter being adapted to send impulses timed to operate the printing devices to print a number corresponding to the setting of the commutators, and the other emitter being adapted to send impulses inversely timed to control the printing devices to print the complement of the number corresponding to the setting of the commutators, means for testing the highest order element to determine if it stands at "9", and means under control of said testing means for selecting one of the emitters for total printing control.

4. In a machine of the class described, an accumulator comprising a plurality of accumulating elements, means for entering amounts into said accumulator, means for taking an inverted reading of said elements, other means for taking a different inverted reading of said elements, means for determining which of said elements are read by the one reading means and which by the other, total printing devices, and means for operating said printing devices under control of both reading means.

5. In a machine of the class described, an accumulator comprising a plurality of accumulating elements, means for entering positive amounts and complements of negative amounts into said accumulator, means for taking an inverted nines complement reading of said elements, means for taking an inverted tens complement reading of the elements, means under control of the elements to the right of the element containing the first significant number on the right in the accumulator for selecting the tens complement reading of the element containing the first significant figure on the right and the nines complement reading of the remaining higher orders, total printing devices, and means for operating said printing devices under control of the reading means.

6. In a machine of the class described, an accumulator comprising a plurality of accumulating elements, means for entering credit and debit items and adjusting said elements to retain numbers repersenting positive and negative balances, two sets of commutator devices adjusted by said accumulator elements, two emitters for sending differentially timed impulses through said devices, the one emitter being adapted to emit impulses timed to give a tens complement reading of the setting of one set of commutators, the other emitter being adapted to emit impulses timed to give a nines complement reading of the setting of the other set of commutators, and a printing mechanism operated in synchronism with said emitters and controlled by said impulses to print a total showing a negative balance as a true number.

7. In a machine of the class described, an accumulator comprising a set of accumulating wheels, means for operating said wheels to enter positive amounts and complements of negative amounts, two sets of commutator rings, a series of paired brush contacts, each pair being adjusted by a related accumulator wheel, one brush cooperating with a commutator ring in one set and the other brush cooperating with one of the rings in the other set, two impulse emitters, one emitter being adapted to send impulses through one set of rings and timed to give a tens complement reading of the wheels, the other emitter being adapted to send impulses through the other set of rings and timed to give a nines complement reading of the wheels, means under control of the lower order wheels to the right of the wheel containing the first significant number to the right for directing the tens complement impulses through the lowest order containing a significant number and directing the nines complement impulses through all the higher orders, and a printing mechanism operated in synchronism with said emitters and controlled by said impulses to print a true number indicating the negative balance standing on the accumulator wheels.

8. In a machine of the class described, an accumulator comprising a plurality of denominational order wheels, means for operating the wheels to add amounts and complements of amounts, means for taking a nines complement reading of the accumulator orders, means for taking a tens complement reading of the accumulator orders, means under control of lower order wheels standing at zero for selecting the tens complement reading of the next higher order, and a printing means controlled by both reading means to print the complement of an amount appearing on the accumulator.

CLAIR D. LAKE.
GEORGE F. DALY.